(12) United States Patent
Yasuda et al.

(10) Patent No.: US 7,457,704 B2
(45) Date of Patent: Nov. 25, 2008

(54) NAVIGATION APPARATUS FOR VEHICLE

(75) Inventors: Takashi Yasuda, Kariya (JP); Masami Mikame, Anjo (JP); Hidenobu Suzuki, Okazaki (JP); Hiromichi Inayoshi, Okazaki (JP); Kensuke Takeuchi, Okazaki (JP)

(73) Assignees: Denso Corporation, Kariya (JP); Toyota Jidosha Kabushiki Kaisha, Aichi-pref (JP); Aishin Aw Co., Ltd., Anjo (JP)

( * ) Notice: Subject to any disclaimer, the term of this patent is extended or adjusted under 35 U.S.C. 154(b) by 0 days.

(21) Appl. No.: 10/893,871

(22) Filed: Jul. 20, 2004

(65) Prior Publication Data

US 2005/0049779 A1 Mar. 3, 2005

(30) Foreign Application Priority Data

Aug. 28, 2003 (JP) ............................. 2003-304496

(51) Int. Cl.
*G01C 21/30* (2006.01)

(52) U.S. Cl. ...................... 701/201; 701/212; 340/990; 340/995.15

(58) Field of Classification Search ................. 701/200, 701/208, 207, 212, 209, 201; 340/995.15, 340/995.19, 988, 990, 995.1, 995.17, 995.18; 715/702

See application file for complete search history.

(56) References Cited

U.S. PATENT DOCUMENTS

| | | | | |
|---|---|---|---|---|
| 5,452,212 A * | 9/1995 | Yokoyama et al. | .......... | 701/211 |
| 5,515,283 A * | 5/1996 | Desai et al. | ................. | 701/200 |
| 6,421,604 B1 * | 7/2002 | Koyanagi et al. | ........... | 701/208 |
| 6,424,933 B1 * | 7/2002 | Agrawala et al. | .............. | 703/2 |
| 6,434,482 B1 * | 8/2002 | Oshida et al. | ............... | 701/209 |
| 6,560,533 B2 * | 5/2003 | Sugawara et al. | ........... | 701/211 |
| 6,587,787 B1 * | 7/2003 | Yokota | ....................... | 701/212 |
| 6,721,655 B1 * | 4/2004 | Utsumi | ....................... | 701/210 |
| 6,732,049 B2 * | 5/2004 | Sato et al. | .................... | 701/212 |
| 6,850,838 B2 * | 2/2005 | Morita | ....................... | 701/207 |
| 6,856,901 B2 * | 2/2005 | Han | ........................... | 701/211 |
| 6,950,743 B2 * | 9/2005 | Kainuma et al. | ........... | 701/208 |
| 2001/0007090 A1 * | 7/2001 | Irie et al. | .................... | 701/211 |
| 2001/0045949 A1 * | 11/2001 | Chithambaram et al. | .... | 345/418 |
| 2002/0049533 A1 * | 4/2002 | Kusano et al. | .............. | 701/209 |
| 2002/0169548 A1 * | 11/2002 | Kuroda et al. | ............... | 701/212 |

(Continued)

FOREIGN PATENT DOCUMENTS

EP 0944032 9/1999

(Continued)

*Primary Examiner*—Tuan C To
(74) *Attorney, Agent, or Firm*—Posz Law Group, PLC

(57) ABSTRACT

A vehicle navigation apparatus displays an expressway guide diagram indicating the names of plural exits at which a travelling vehicle can exit an expressway and the distance and estimated arrival time to each of the exits. The expressway guide diagram includes a map display for indicating a display of a surrounding-area map of an exit. When the map display is operated, the display scale of the surrounding-area map is determined so as to contain a predetermined number of representative facilities, and the surrounding-area map is displayed on a display device according to the display scale. Therefore, with respect to each exit at which the vehicle can get off the expressway, a map based on the proper display scale corresponding to the positional relationship between each exit and facilities can be displayed.

16 Claims, 7 Drawing Sheets

U.S. PATENT DOCUMENTS

| | | | |
|---|---|---|---|
| 2003/0018427 A1* | 1/2003 | Yokota et al. | 701/208 |
| 2003/0154023 A1* | 8/2003 | Utsumi | 701/209 |
| 2004/0117109 A1* | 6/2004 | Kodani et al. | 701/200 |
| 2004/0172193 A1 | 9/2004 | Monde et al. | |
| 2004/0204829 A1* | 10/2004 | Endo et al. | 701/202 |

FOREIGN PATENT DOCUMENTS

| | | | |
|---|---|---|---|
| JP | A-8-261780 | | 10/1996 |
| JP | 10039749 A | * | 2/1998 |
| JP | A-2002-131070 | | 5/2002 |
| JP | 2003161621 A | * | 6/2003 |
| JP | 2003186594 A | * | 7/2003 |
| JP | A-2004-170233 | | 6/2004 |

* cited by examiner

| SCALE | RANGE (LONGITUDE × LATITUDE) |
|---|---|
| 1 | 1km × 0.5km |
| 2 | 2km × 1km |
| 4 | 4km × 2km |
| 8 | 8km × 4km |

# NAVIGATION APPARATUS FOR VEHICLE

CROSS REFERENCE TO RELATED APPLICATION

This application is based upon, claims the benefit of priority of, and incorporates by reference the contents of Japanese Patent Application No. 2003-304496 filed on Aug. 28, 2003.

FIELD OF THE INVENTION

The present invention relates to a vehicle navigation apparatus for giving guidance, and, more particularly, to a vehicle navigation apparatus that gives guidance regarding facilities in close proximity to travel route exits.

BACKGROUND OF THE INVENTION

A vehicle navigation apparatus for displaying various information needed by vehicle users while traveling on a travel route such as an expressway are generally known. For example, a navigation apparatus disclosed in JP-A-8-261780 is designed to store point information containing the name of points such as an interchange, a service area or the like off an expressway, position information of each point and the distance between points, and a fixed-form expressway background pattern having blocks in which the point names of point information are included. In this apparatus, point information containing the names of points over which a vehicle will pass is read out on the basis of current position information obtained by GPS (Global Positioning System), and at the same time an expressway background pattern is read out. The point names thus read out are developed into the blocks of the expressway background pattern to create display data. As described above, the above apparatus makes it possible to simply display the relationship between the vehicle concerned and each point such as an interchange, service area or the like on the expressway.

Furthermore, according to the navigation apparatus described above, when a service area exists within a predetermined distance from the position of the vehicle, the name of the service area and facilities in the service area are displayed. In this way, a user can check whether there are desired facilities in an approaching service area.

Some travel routes do not include many service areas (sometimes referred to as rest stops). When the user drives a vehicle on such a route, the user must temporarily exit and find a gas station, restaurant or the like for obtaining gas, eating or generally resting.

Under such a situation, however, the navigation apparatus as described above merely displays facilities in service areas equipped on the travel route. Therefore, such a navigation apparatus cannot provide sufficient information to passengers of a vehicle on a travel route not including many service areas.

SUMMARY OF THE INVENTION

The present invention has been implemented in view of the foregoing situation, and has an object to provide a vehicle navigation apparatus which can provide desired information in an easy way when a user is driving on a travel route (expressways) to which road-ancillary facilities such as service areas, etc. are hardly included.

In order to attain this object, a vehicle navigation apparatus according to a first aspect of the present invention comprises a display device, a current position detecting unit for detecting the current position of a vehicle, a storage unit for storing at least map data of surrounding areas of exits of expressways and information on the exits of the expressways, an exit information display controller for achieving, from the storage unit, information on an exit at which the vehicle can get off an expressway, when the vehicle is on the expressway, on the basis of the current position detected by the current position detecting unit, and displaying the information thus achieved on the display device. The vehicle navigation apparatus further comprises an instruction operating unit for instructing a display of a map around the exit which is displayed on the display device and at which the vehicle can get off and a surrounding-area map display controller for determining a display scale of a surrounding-area map so as to contain a predetermined number of facilities and displaying the surrounding-area map on the display device according to the display scale when the surrounding-area map is instructed to be displayed by the instruction operating unit.

In the vehicle navigation apparatus of the first aspect of the present invention, the information on an expressway exit is displayed as in the conventional apparatus. However, the vehicle navigation apparatus is further equipped with the instruction operating unit for instructing to display the map of a surrounding area of the exit on the display device and at which the vehicle can get off the expressway, and the surrounding-area map display controller for adjusting the display scale of the map so as to contain a predetermined number of facilities and display the surrounding-area map when the display of the surrounding-area map is instructed.

Therefore, for each exit at which a vehicle can get off an expressway, a map containing facilities existing around the exit concerned can be simply displayed. Furthermore, since the scale of the display map is adjusted so as to contain a predetermined number of facilities, the guidance of the facilities can be surely performed, and also the map can be displayed at a proper display scale which is conformed with the positional relationship between each exit and facilities around it.

According to a second aspect of the present invention, in the vehicle navigation apparatus described above, the surrounding-area map display controller preferably displays the surrounding-area map so that the exit at which the vehicle can get off the expressway is located substantially at the center of the display device. Accordingly, any facility can be displayed to be contained in the display map without requiring excessive scaling of the display map to the direction from the exit in which the facility is located.

According to a third aspect of the present invention, in the vehicle navigation apparatus described above, when the exit at which the vehicle gets off the expressway contains plural exit points, the surrounding-area map display controller preferably displays the surrounding map so that the center-of-gravity position of the plural exit points is located substantially at the center of the display device. Accordingly, the surrounding-area map can be displayed in conformity with all the exit points irrespective of an exit point at which the vehicle actually gets off the expressway. Here, the exit point means a point at which an exit road branched from the main road of the expressway is connected to a general road.

According to a fourth aspect of the present invention, in the vehicle navigation apparatus described above, the surrounding-area map display controller sets plural display scales as the display scale for a surrounding-area map in advance, and the surrounding-area map is displayed in the minimum display scale so as to contain a predetermined number of facilities by judging whether the surrounding-area map of each display scale contains the predetermined number of facilities while successively changing the display scale of the surrounding-area map in increasing order of display scale. Accordingly, an excessively scale-up map is prevented from being used as a map containing a predetermined number of facilities, and thus roads, etc. located between the exit of the expressway and each of the facilities can be displayed as minutely as possible. Therefore, a route from the exit of the expressway to a target facility can be guided in a way easy to understand.

According to a fifth aspect of the present invention, in the vehicle navigation apparatus described above, the surrounding-area map display controller sets the maximum display scale of the surrounding-area map so that plural exits are not simultaneously contained in a display range, and displays the surrounding-area map in a display scale smaller than the maximum display scale. When plural exits are simultaneously displayed on a map, there is a higher chance that a user will fail to recognize the positional relationship between an exit at which the user is going to get off and the facilities.

However, according to a sixth aspect of the present invention, in the vehicle navigation apparatus described above, when no facility is contained in the surrounding-area map of the maximum display scale, the surrounding-area map display controller preferably displays a surrounding-area map of a larger display scale. When the number of facilities to be displayed is equal to zero, it is not preferable to display the surrounding-area map.

According to a seventh aspect of the present invention, in the above vehicle navigation apparatus described above, the exit information display controller displays the names of plural exits and the distance/time needed for the vehicle to arrive at each exit as information concerning exits at which the vehicle can get off the expressway (hereinafter referred to as "possible exit choices"). By displaying the names of plural exits and the distance and/or time needed for the vehicle to arrive at each exit as the information on the possible exit choices, the passengers of the vehicle can more easily make a schedule for filling gas, taking a rest, etc.

According to an eighth aspect of the present invention, the vehicle navigation apparatus described above is further equipped with a selecting unit for selecting the name of one exit from the names of plural exits, and the exit information display controller further displays, as the information concerning the possible exit choices, the types of facilities existing around the exit selected by the selecting unit. Accordingly, a user can check the types of the facilities existing around each exit before displaying a surrounding-area map. Therefore, the user can easily specify an exit around which his/her desired facilities exist.

According to ninth and tenth aspects of the present invention, it is preferable in the vehicle navigation apparatus described above that a user can freely set the number and types of facilities contained in a surrounding-area map. Accordingly, when a surrounding-area map of each exit of an expressway is displayed so as to contain facilities, the map can be flexibly adapted to each user's individual request or situation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

First Embodiment

A vehicle navigation apparatus according to a first embodiment of the present invention will be described.

Figures 1, 3:
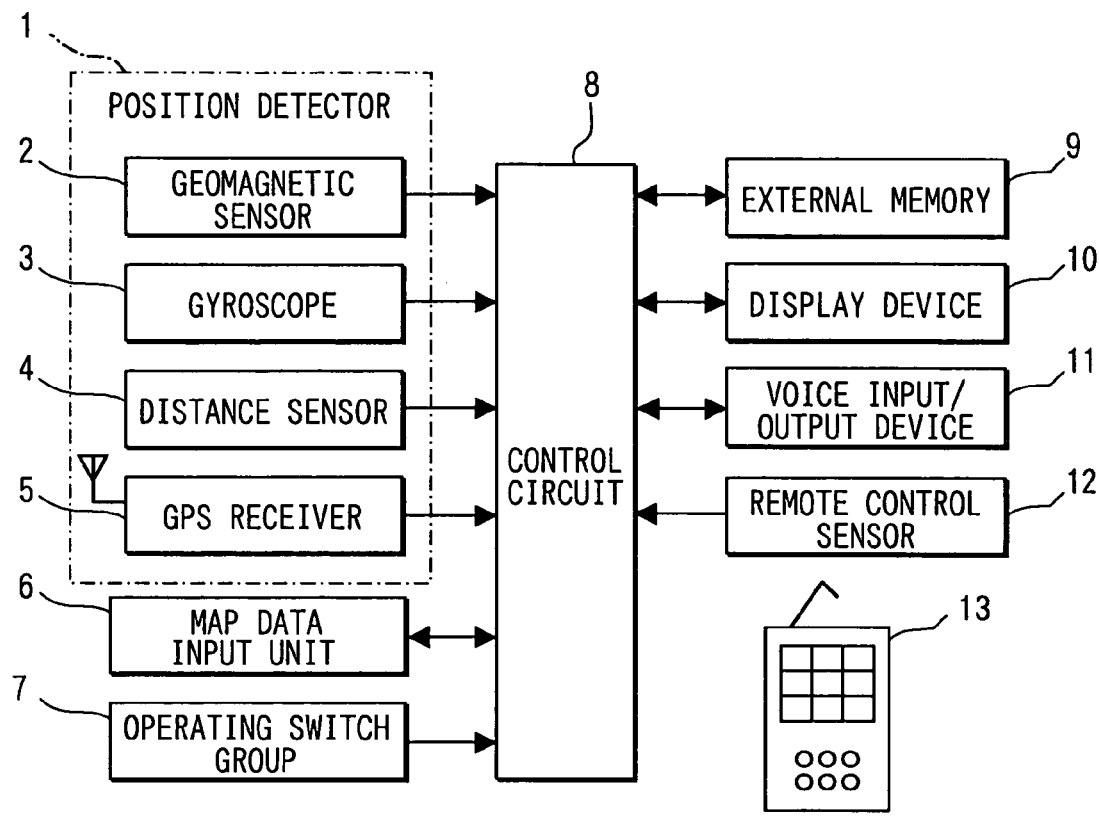
FIG. 1 is a block diagram showing the construction of a vehicle navigation apparatus according to a first preferred embodiment.
FIG. 3 is a table showing predetermined scale and display range of a surrounding map for providing guidance to a surrounding area of an exit off an expressway.

FIG. 1 is a block diagram showing the schematic construction of a vehicle navigation apparatus according to the first embodiment. As shown in FIG. 1, the vehicle navigation apparatus of this embodiment is equipped with a position detector 1, a map data input unit 6, an operation switch group 7, an external memory 9, a display device 10, a voice input/output device 11, a remote control sensor 12 and a control circuit 8 connected to these elements.

The control circuit 8 is constructed as a normal computer, and it is internally equipped with well-known CPU, ROM, RAM, I/O and a bus line connecting these elements. A program to be executed by the control circuit 8 is written in ROM, and a CPU or the like executes predetermined operation processing according to this program. This program may be achieved from the external through the external memory 9.

The position detector 1 comprises a geomagnetic sensor 2, a gyroscope 3, a vehicle speed sensor 4 for calculating the travel distance, and a GPS receiver 5 for GPS for detecting the position of the vehicle on the basis of electric waves from satellites. These elements have errors which are different in characteristic from one another, and thus they are used to complement each another. The position detector 1 may be constructed as a part of the above elements in accordance with the precision of each sensor.

The map data input unit 6 is a device for inputting into the control circuit 8 map data containing road map data and marking data to draw a road map. A CD-ROM or DVD-ROM is generally used as a storage medium for storing the map data in consideration of the data amount thereof, however, a writable storage medium such as a memory card, a hard disc or the like may be used. Furthermore, the storage medium of the map data input unit 6 stores at least information concerning facilities existing around each exit of a travel route, such as an expressway. The information may include the names of the facilities, the positions of the facilities, the types of the facilities, etc. The storage medium also stores position information of exit representative points of each exit of the expressway as absolute coordinates. In order to carry out a type-based display of facilities existing around each exit of an expressway in an expressway guide diagram described later, it is preferable that each exit and information of facilities existing around the exit concerned are stored in association with each other in advance. Accordingly, search processing, etc. when the type-based display is carried out, can be quickly carried out.

Here, an exit representative point of an exit of an expressway is defined as follows. That is, when there is only one exit road for exiting the expressway, the exit representative point corresponds to a point at which the exit road concerned is connected to a general road. Furthermore, when plural exit roads exit at one exit of the expressway, the exit representative point corresponds to the point corresponding to the center-of-gravity position of points (exit points) at which the respective exit roads are connected to general roads.

The operating switch group 7 comprises a touch switch, a mechanical switch or the like which is unified with a display device 10 described later, and used for various kinds of input operations such as a scroll operation of a map displayed on the screen of the display device 10, selection of an expressway guide mode, which will be described later, selection of one of operation keys displayed, etc.

The external memory 9 comprises a storage medium such as a memory card, a hard disc or the like. The external memory 9 is used to store various kinds of data such as text data, image data, voice data, etc.

The display device 10 comprises a liquid crystal display, for example, and a road map around the vehicle created on the basis of a vehicle mark indicating the vehicle current position input from the position detector 1 and map data input from the map data input unit 6 is displayed on the screen of the display device 10 through the processing of the control circuit 8. Furthermore, when the expressway guide mode is selected b y the operation of the operating switch group 7, a road map around the current position is displayed, and also an expressway guide diagram containing a list of exits at which the running vehicle can exit the expressway, etc. is displayed. Furthermore, when display of an exit surrounding-area map of the expressway is instructed, a surrounding-area map containing facilities existing around the exit concerned is displayed.

Figure 2:
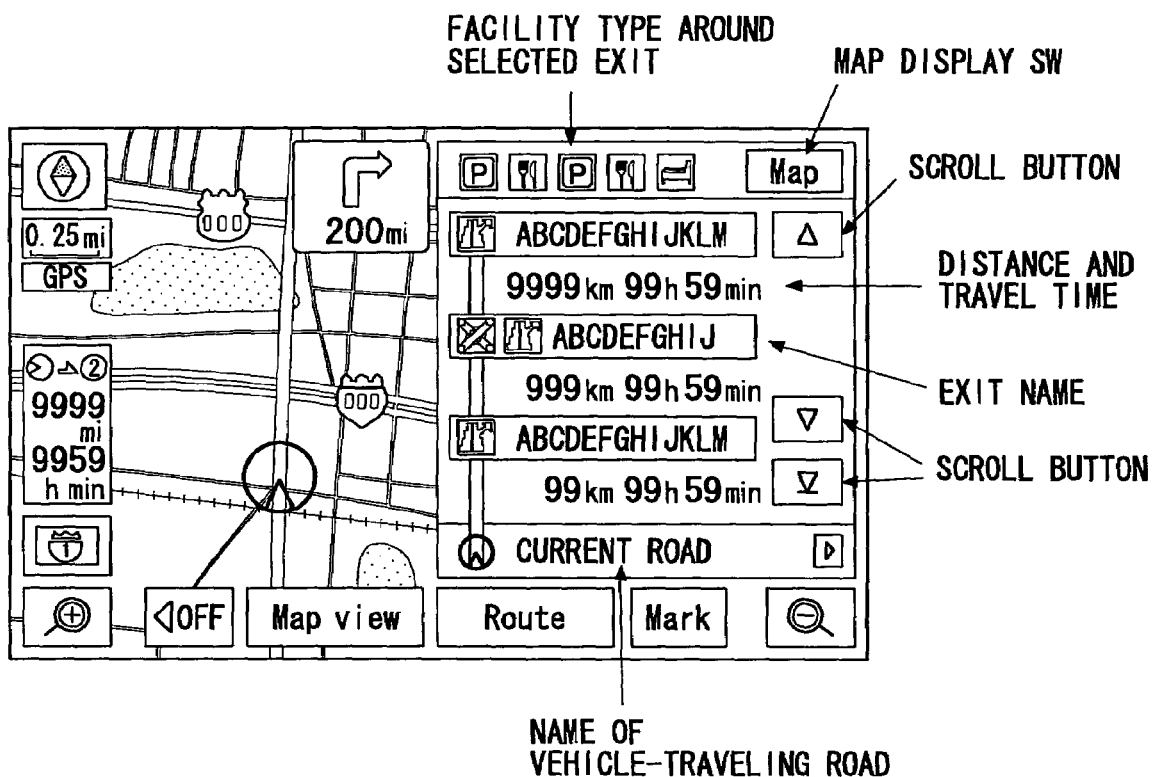
FIG. 2 is a diagram showing a display containing an expressway guide diagram displayed when an expressway guide mode is selected.

FIG. 2 shows a display example on the display device 10 when the expressway guide mode is selected. A vehicle mark indicating the position of the vehicle and a road map around the vehicle are displayed at the left side of the screen. In addition, an expressway guide diagram is displayed at the left side of the screen. The expressway guide diagram preferably displays the name of an expressway along which the vehicle travels at present, and the names of possible exit choices (up to three exits) extracted on the basis of the current position and the travel direction of the vehicle. With respect to the names of the possible exit choices, they can be scrolled by the scroll button, and thus three or more exit names can be checked.

The distance from the current position of the vehicle to each exit and the time needed for the vehicle to arrive at the exit concerned are displayed in the neighborhood of the name of each exit. By displaying the distance and the time needed for the arrival as described above, a passenger(s) of the vehicle can more easily make a schedule to fill the vehicle with gas, take a rest or the like. Furthermore, by selecting the name of an exit displayed in the expressway guide diagram with a cursor, icons indicating the types, or categories, of facilities existing around the exit thus selected are displayed at the upper portion of the screen. Accordingly, the passenger (s) of the vehicle can easily check the types of the facilities existing around each exit.

Furthermore, a map display SW is displayed at the upper right side of the expressway guide diagram. When the map display SW is operated by the operating switch group 7, a surrounding-area map containing facilities around an exit being selected is displayed. This surrounding-area map is displayed so that the exit representative points of the exit at which the vehicle can exit the expressway are located substantially at the center of the display device 10. Accordingly, in whichever direction around the exit of the expressway a desired facility exits, the facility concerned can be contained in the display map without excessively increasing the display scale. Furthermore, even when the exit of the expressway contains plural exit points, the surrounding-area map can be displayed in conformity with all the exit points irrespective of the exit point at which the vehicle actually gets off the expressway.

As shown in FIG. 3, four-stage scales (scale 1, scale 2, scale 4, and scale 8) are set as the display scale of the surrounding-area map in advance. The display scale is determined so that all respective types of surrounding facilities displayed in the expressway guide diagram can be contained in the surrounding-area map, and the surrounding-area map is displayed according to the display scale thus determined. Accordingly, roads, etc. from the exit to the facilities can be displayed in a way easy to understand without excessively increasing the display scale of the surrounding-area map. Furthermore, if the facilities to be displayed in the surrounding-area map are limited to those types of facilities displayed in the expressway guide diagram, the surrounding-area map can be displayed in a way much easier to understand without confusing the passenger(s) with unnecessary information. The processing of determining the display scale of the surrounding-area map will be described later.

The voice input/output device 11 comprises a voice input portion and a voice output portion. The voice input portion recognizes a user's speech to enable various operations of the navigation apparatus to be carried out by inputting voices. Furthermore, the voice output portion comprises a speaker, an audio amplifier or the like. For example, when a destination is set and a guide route to the destination is determined, a voice guide or the like for the guide route is carried out.

The vehicle navigation apparatus of this embodiment is equipped with a remote control sensor 12 for receiving an operation signal from a remote control terminal (hereinafter referred to as "remote controller") 13 in a wireless mode. By operating this remote controller 13, substantially the same various input operations as the operating switch operation 7 described above can be carried out.

Figure 4:
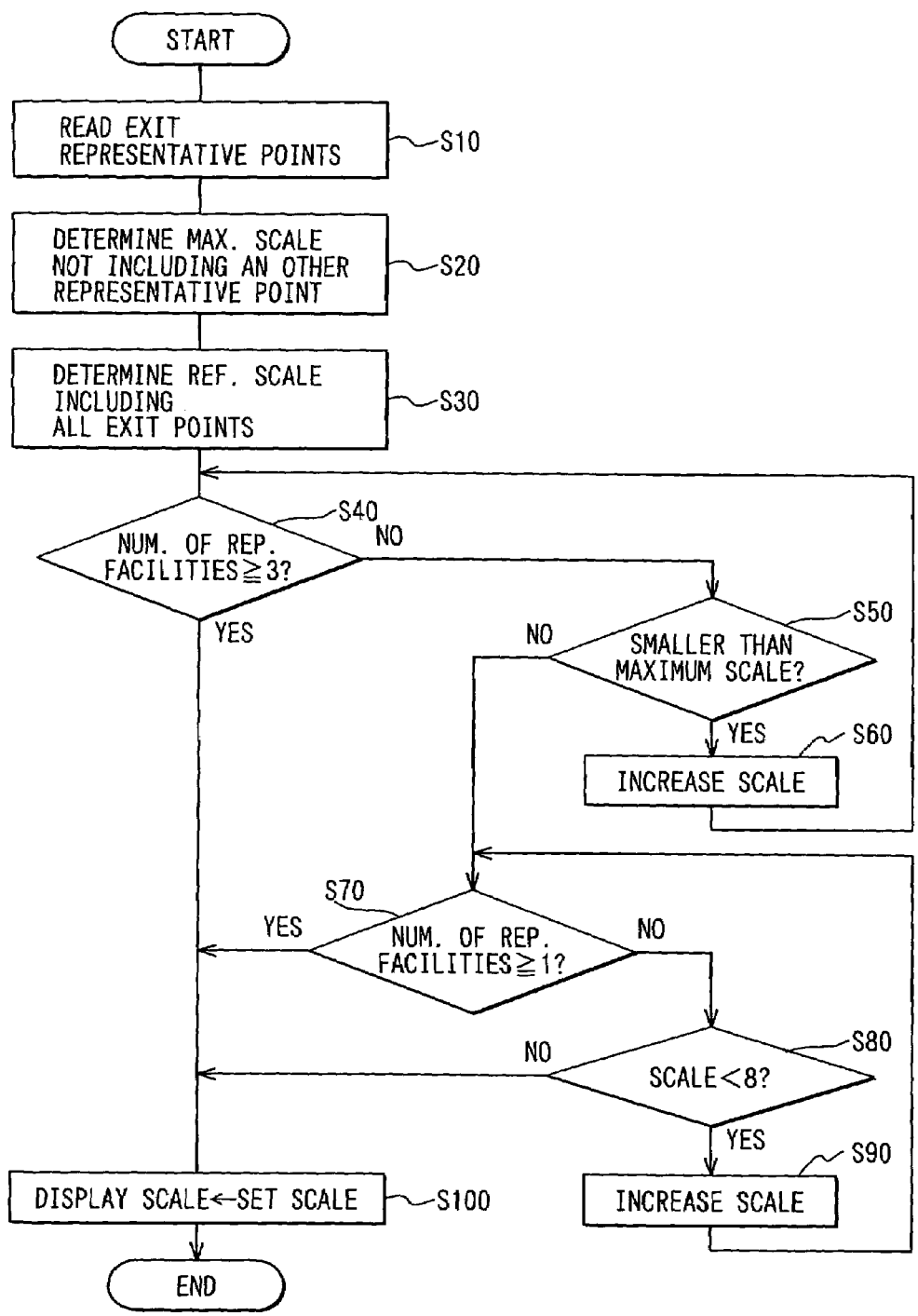
FIG. 4 is a flowchart showing the processing of determining the display scale of the surrounding map of the expressway exit in the expressway guide diagram when a map display SW is operated.

Next, the processing of determining the display scale of the surrounding-area map of an expressway exit when the map display SW is operated in the expressway guide diagram will be described with reference to the flowchart of FIG. 4.

Figure 5:
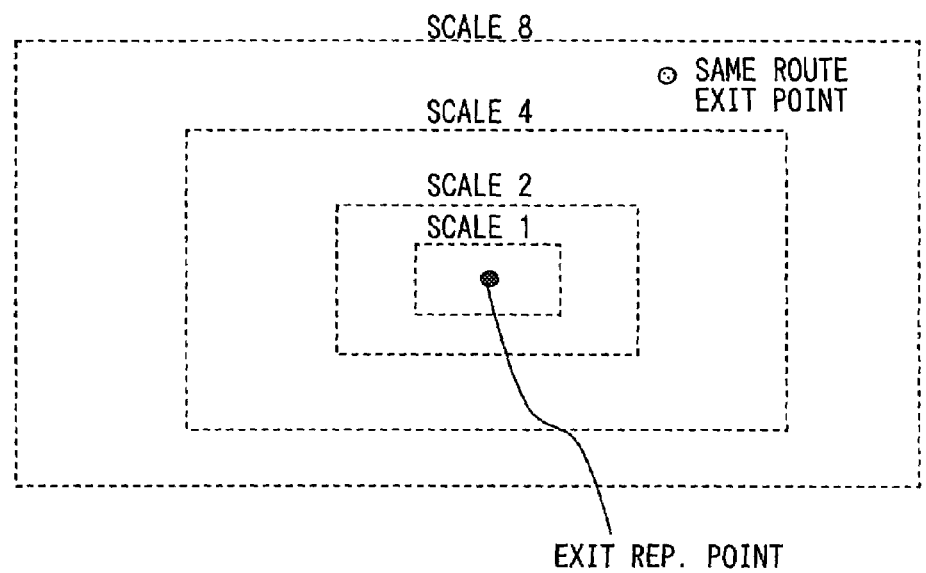
FIG. 5 is a diagram showing the processing of determining the maximum scale when the surrounding-area map is displayed so that plural exit representative points are not contained in the map.

First, the position information of the exit representative points of the exit being selected in the expressway guide diagram and the exit representative points of exits before and after the exit being selected are read in step S10. In step S20, the maximum display scale for displaying a surrounding-area map containing the exit representative points substantially at the center thereof is determined on the basis of the position information of the exit representative points read in step S10. Thereafter, the exit representative points of the exits before and after the exit being selected are not contained in the surrounding-area map. For example, FIG. 5 shows a case in which the display scale of the surrounding-area map in which the exit representative points of the exit being selected in the expressway guide diagram are located at the center thereof is set to the scale 8, the exit representative points of the next exit on the same expressway (the same line) are contained in the display range of the surrounding-area map. When plural exits are displayed on the map at the same time as described above, a user fails to recognize the positional relationship between the chosen exit and the facilities around this exit. Accordingly, the scale 4 is set as the maximum scale in the example shown in FIG. 5.

Subsequently, in step S30, the reference scale used for displaying the surrounding-area map of the expressway exit is determined. The reference scale means the minimum scale of a surrounding-area map which can contain all exit representative points when the exit of the expressway contains plural exit representative points. That is, in order to guide the surrounding area of an expressway exit, the map to be displayed is required to contain the exit points corresponding to the points at which the exit road is connected to general roads.

Figure 6:
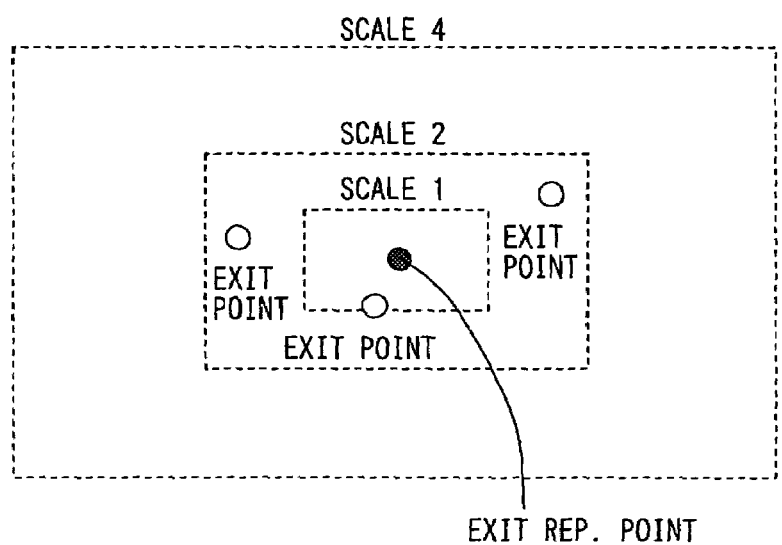
FIG. 6 is a diagram showing the processing of determining the reference scale of the surrounding-area map of the expressway exit.
Figure 7:
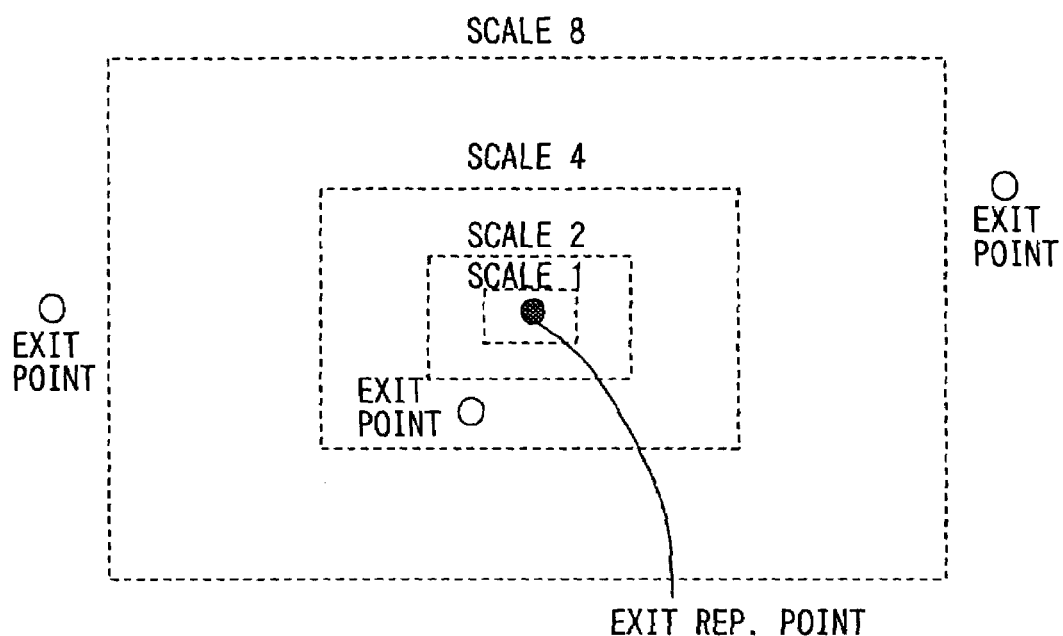
FIG. 7 is a diagram showing the processing of determining the reference scale of the surrounding-area map of the expressway exit.

Therefore, the minimum scale of the surrounding-area map containing all the exit points is defined as the reference scale. The display scale of the surrounding-area map is adjusted in the scale range above the reference scale. For example, in the example shown in FIG. 6, the exit of the expressway contains three exit points, and these three exit points are contained in the surrounding-area map of the scale 2. Accordingly, in this case, the scale 2 is determined as the reference scale. However, when all the exit points cannot be contained in even the surrounding-area map of the maximum scale (scale 8) out of four-level scales predetermined as the display scale of the surrounding-area map as shown in FIG. 7, the scale 8 is set as the reference scale.

In step S40, it is judged whether three or more representative facilities are contained in the surrounding-area map of the set scale. When the processing of the step S40 is initially carried out, the reference scale determined in step S30 is set as the set scale. The representative facility means the type of each facility. That is, in this judgment step, the number of facilities included in the surrounding-area map is not merely judged, but it is judged whether preset three or more types of facilities are included in the surrounding-area map. In this embodiment, a gas station, a restaurant and convenience store are assumed as the types of facilities to be included in the surrounding-area map, and thus it is judged in step S40 whether all the three types of facilities described above are included in the surrounding-area map.

However, the types of facilities which should be included in the surrounding-area map are not limited to these three, and for example, other facilities such as accommodation facilities, etc. may be included in the surrounding-area map. Furthermore, a user may freely set the types and number of facilities which should be included in the surrounding-area map. Accordingly, when a surrounding-area map of an expressway exit is displayed so as to contain facilities, the display can be flexibly adapted to an individual user's request or situation.

When "Yes" is judged in step S40, the set scale of the surrounding-area map is determined as a display scale because the surrounding-area map achieved contains necessary facilities. On the other hand, when "No" is judged in step S40, the number of representative facilities included in the surrounding-area map is smaller than a predetermined number, and thus the process goes to step S50. In step S50, it is judged whether the set scale is smaller than the maximum scale determined in step S20. If it is judged that the set scale is smaller than the maximum scale, the set scale is incremented by one level in step S60, and then the processing of step S40 is carried out. Accordingly, in the judgment processing of step S4 executed again, it is judged whether three representative facilities are contained in the range of the surrounding-area map based on the set scale which has been incremented by one level. As described above, it is judged whether the surrounding-area map of each scale contains three representative facilities while the scale of the surrounding-area map is successively changed in increasing order of display scale. Therefore, it can be prevented that an excessively scaled-up map is used as a surrounding-area map containing three representative facilities, and the roads, etc. between the exit of the expressway and the facilities can be displayed as minutely as possible. Accordingly, the route from the exit of the expressway to a desired facility can be guided to users in a easy way to understand.

Figure 8:
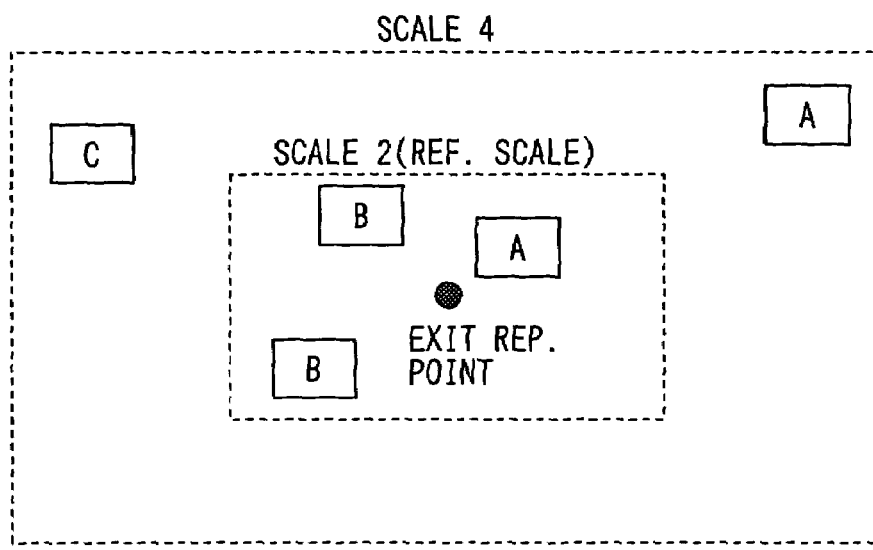
FIG. 8 is a diagram showing the processing of increasing the scale of the surrounding-area map so that a predetermined number of representative facilities are contained in the map.

For example, in the example of FIG. 8, when the scale 2 is determined as the reference scale, only two representative facilities (facility A and facility B) are included in a surrounding-area map based on the reference scale. Therefore, it is judged again whether three representative facilities are included in a surrounding-area map based on the set scale (scale 4) larger than the reference scale. In this judgment, three representative facilities (facility A, facility B, facility C) are included in the surrounding-area map, and thus the set scale (scale 4) is determined as the display scale.

Figure 9:
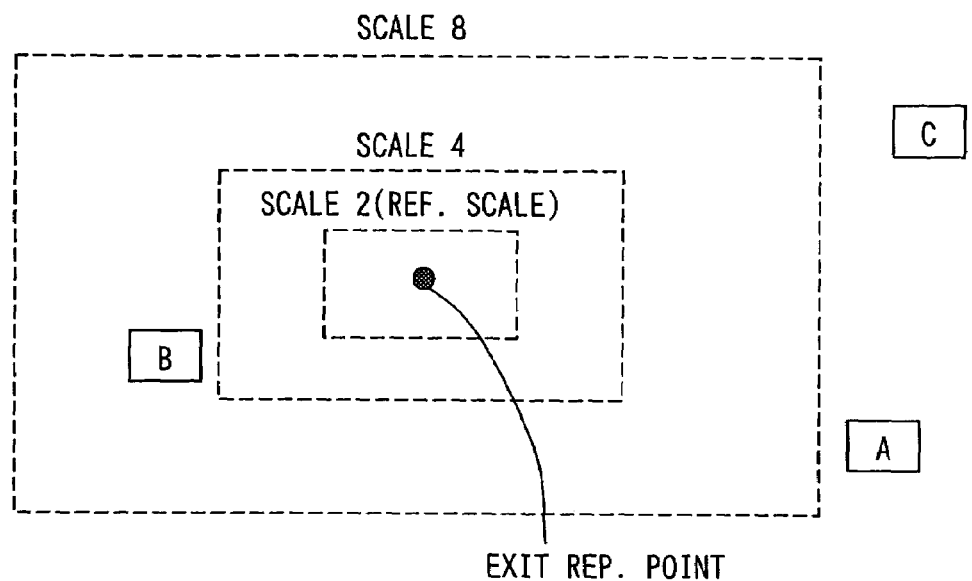
FIG. 9 is a diagram showing the processing of determining the display scale when the predetermine number of representative facilities are not contained in the map even when the scale of the surrounding-area map is increased.

When it is judged in step S50 that the set scale reaches the maximum scale, the process goes to step S70, and it is judged whether at least one representative facility is included in the surrounding-area map based on the set scale concerned. At this time, if "Yes" is judged, the process goes to step S100 to determine the set scale at that time as the display scale. FIG. 9 shows this situation. That is, when the scale is successively increased from the reference scale (scale 2), and the surrounding-area map based on the maximum scale (scale 8) is judged to include one representative facility (facility B), "No" is judged in both the steps S40 and S50. However, since the surrounding-area map contains one representative facility (facility B), "Yes" is judged in step S70, and thus the set scale at that time is determined as the display scale.

On the other hand, if "No" is judged in step S70, the process goes to step S80 to judge whether the set scale is smaller than the scale 8. If it is judged that the set scale is smaller than the scale 8, the process goes to step S90 to increase the set scale and carry out the judgment processing of the step S70.

As described above, it is not preferable that plural exit representative points are contained in a surrounding-area map of an expressway exit. However, when no representative facility is contained in the surrounding-area map based on the maximum scale which does not contain plural exit representative points, it would not contribute to guidance of facilities even if such a surrounding-area map is displayed. Therefore, in the steps S70 to step S90, the scale of the surrounding-area map is set to be larger than the maximum scale in which plural exit representative points are not contained only when the number of representative facilities contained in the surrounding-area map based on the maximum scale is equal to zero. In this case, plural exit representative points may be displayed in the surrounding-area map displayed. However, in this case, the possibility that representative facilities are included in the surrounding-area map can be enhanced.

As described above, according to this embodiment, the map display SW is equipped in the expressway guide diagram, and thus with respect to each exit at which a vehicle can get off an expressway, a surrounding-area map containing facilities existing around the exit concerned can be simply displayed. Furthermore, the display scale of a display map containing a predetermined number of representative facilities can be automatically adjusted, so that a map having a proper display scale can be displayed in accordance with the positional relationship between each exit and representative facilities.

Other Embodiments

The present invention is not limited to the above-described first embodiment, and various modifications may be made without departing from the spirit of the present invention.

Figure 10:
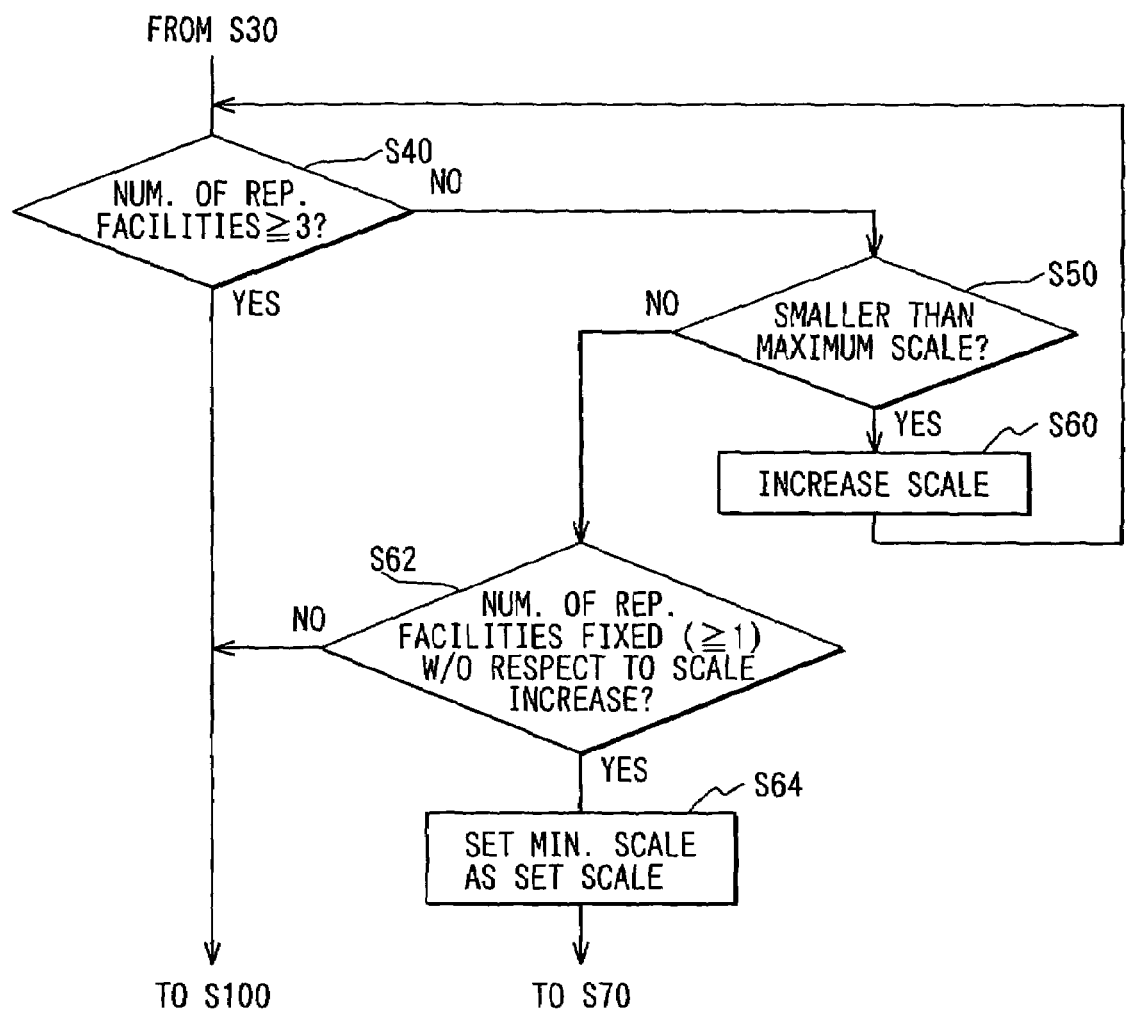
FIG. 10 is a flowchart showing the processing of determining the scale of a surrounding-area map according to another embodiment of the present invention.

For example, in a case where the number of representative facilities is not varied between a surrounding-area map having some set scale and a surrounding-area map having a smaller scale even when the set scale of the surrounding-area map is successively increased, the set scale may be returned to the smaller scale. FIG. 10 is a flowchart showing the processing for implementing such an operation. In the flowchart of FIG. 10, step S62 and step S64 are added to the flowchart of FIG. 4.

Figure 11:
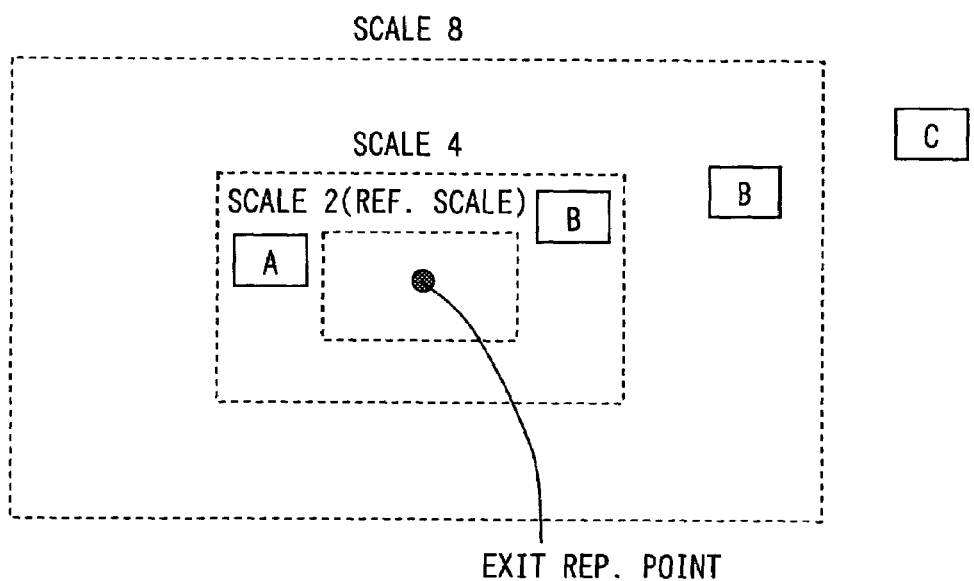
FIG. 11 is a diagram showing the processing of determining the scale of the surrounding-area map according to another embodiment.

In step S62, when the set scale is increased u p to the maximum scale, it is judged whether the number of representative facilities included in the surrounding-area map is fixed ($\geq 1$) irrespective of the increase of the scale. At this time, if it is judged that the number of representative facilities is not fixed, that is, the number of representative facilities is increased in connection with the increase of the scale, the set scale is kept to the maximum scale. On the other hand, if it is judged that the number of representative facilities is fixed irrespective of the increase of the scale, the process goes to step S64, and the set scale is set to the smallest scale among the respective scales of the surrounding-area maps in which the fixed number of representative facilities are contained. Therefore, in the example shown in FIG. 11, for example, through the processing as described above, even when the set scale is increased up to the scale 8, the number of representative facilities included in the surrounding-area map is not varied, so that the set scale is returned to the scale 4.

Furthermore, in the first embodiment, the display scale of the surrounding-area map is adjusted by four levels. However, it may be adjusted by a smaller or larger number of levels.

Still furthermore, as a method of determining the display scale of the surrounding-area map, it is possible that facilities to be contained in a surrounding-area map is first specified, and then the scale of a surrounding-area map which is not smaller than a surrounding-area map containing all the facilities concerned is determined as the display scale from the position information of the facilities concerned.

Still furthermore, in the first embodiment, guidance is made with respect to only the exits of expressways. However, when there are road-ancillary facilities such as service areas, etc., it should be noted that the guidance concerning the ancillary facilities may be made together.

What is claimed is:

1. A vehicle navigation apparatus comprising:
   a display device;
   a current position detecting unit that detects a current position of a vehicle that has the vehicle navigation apparatus;
   a storage unit that stores
      map data of surrounding areas of exits from a travel route of the vehicle and
      information on the exits of the travel route;
   a control circuit, wherein the control circuit
   obtains, from the storage unit, information regarding an upcoming exit among the exits of the travel route on the basis of the current position detected by the current position detecting unit, wherein the control circuit displays the information thus obtained on the display device; and
   displays a surrounding area map of an area around the upcoming exit and determines a display scale of the surrounding area map such that a predetermined number of facilities is included in the surrounding area map; and
   an instruction operating unit through which a user of the vehicle navigation apparatus instructs displaying of the surrounding-area map, wherein:
   the control circuit displays the surrounding-area map on the display device according to the display scale in such a manner that the upcoming exit is located substantially at the center of the display device when the surrounding-area map is instructed to be displayed by the instruction operating unit; and
   when the upcoming exit includes a plurality of exit points, the control circuit displays the surrounding-area map in such a manner that the center-of-gravity position of the plurality of exit points is located substantially at the center of the surrounding-area map displayed on the display device.

2. The vehicle navigation apparatus according to claim 1, wherein the control circuit sets plural display scales as the display scale for a surrounding-area map in advance and displays the surrounding-area map in the minimum display scale so as to include the predetermined number of facilities by judging whether the surrounding-area map of each display scale includes the predetermined number of facilities while successively changing the display scale of the surrounding-area map in increasing order of display scale.

3. The vehicle navigation apparatus according to claim 2, wherein the control circuit sets the maximum display scale of the surrounding-area map so that plural exits are not simultaneously included in a display range and displays the surrounding-area map in a display scale smaller than the maximum display scale.

4. The vehicle navigation apparatus according to claim 3, wherein when no facility is included in the surrounding-area map of the maximum display scale, the control circuit displays a surrounding-area map of a larger display scale.

5. The above vehicle navigation apparatus according to claim 1, wherein the control circuit displays the names of plural exits and the distance/time needed for the vehicle to arrive at each exit as information on possible exit choices defined as exits at which the vehicle can get off the travel route.

6. The vehicle navigation apparatus according to claim 5, further comprising a selecting unit for selecting the name of one exit from the names of plural exits, wherein the control circuit further displays, as the information on the possible exit choices, categories of facilities existing around the exit selected by the selecting unit.

7. The vehicle navigation apparatus according to claim 1, wherein the number of facilities to be contained in the surrounding-area map can be set.

8. The vehicle navigation apparatus according to claim 6, wherein the categories of facilities to be contained in the surrounding-area map can be set.

9. The vehicle navigation apparatus according to claim 1, wherein the control circuit sets plural display scales as the display scale for a surrounding-area map in advance and displays the surrounding-area map in the minimum display scale so as to include a predetermined number of facilities by judging whether the surrounding-area map of each display scale includes the predetermined number of facilities while successively changing the display scale of the surrounding-area map in increasing order of display scale.

10. The vehicle navigation apparatus according to claim 9, wherein the control circuit sets the maximum display scale of the surrounding-area map so that plural exits are not simultaneously included in a display range, and displays the surrounding-area map in a display scale smaller than the maximum display scale.

11. The vehicle navigation apparatus according to claim 10, wherein when no facility is included in the surrounding-area map of the maximum display scale, the control circuit displays a surrounding-area map of a larger display scale.

12. The vehicle navigation apparatus according to claim 1, wherein the exits are exits of an expressway, on which the vehicle currently travels.

13. A vehicle navigation apparatus comprising:
a display device;
a current position detecting unit that detects a current position of a vehicle that has the vehicle navigation apparatus;
a storage unit that stores map data of surrounding areas of exits from a travel route of the vehicle and information on the exits of the travel route;
a control circuit, wherein the control circuit
obtains, from the storage unit, information regarding an upcoming exit among the exits of the travel route on the basis of the current position detected by the current position detecting unit, wherein the control circuit further displays the information thus obtained on the display device; and
displays a surrounding area map of an area around the upcoming exit and determines a display scale of the surrounding area map such that a predetermined number of facilities is included; and
an instruction operating unit through which a user of the vehicle navigation apparatus instructs displaying of the surrounding-area map, wherein:
the control circuit displays the surrounding-area map on the display device according to the display scale when the surrounding-area map is instructed to be displayed by the instruction operating unit; and
the control circuit sets the maximum display scale of the surrounding-area map so that plural exits are not simultaneously included in a display range and displays the surrounding-area map in a display scale smaller than the maximum display scale.

14. A navigation apparatus comprising:
a display device; and
a controller that displays a scalable map, which includes a preselected geographic location, on the display device, wherein:
the controller preselects a scale of the map to be displayed from a plurality of display scales and determines whether at least one facility of a preselected category of facilities is included in the map at the preselected scale;
if the controller determines that the at least one facility is included in the map at the preselected scale, the controller selects the pre-selected scale as a selected display scale and displays the map at the selected display scale;
the preselected geographic location is an upcoming exit of an expressway, on which a vehicle that has the navigation apparatus currently travels; and
the controller sets the maximum display scale of the map so that plural exits are not simultaneously included in a display range, and displays the map in a display scale smaller than the maximum display scale.

15. The navigation apparatus according to claim 14, wherein the controller selects a most detailed map, which includes the at least one facility, as the displayed map.

16. The navigation apparatus according to claim 14, further comprising a means for notifying a user of a plurality of displayable facility categories and for receiving an input of a user, which specifies the at least one preselected category of facilities among the plurality of displayable facility categories.

* * * * *